June 4, 1957  J. O. YORK  2,794,347
TENSIONING DEVICE FOR SPROCKET CHAIN CONVEYORS
Filed July 27, 1953  2 Sheets-Sheet 2
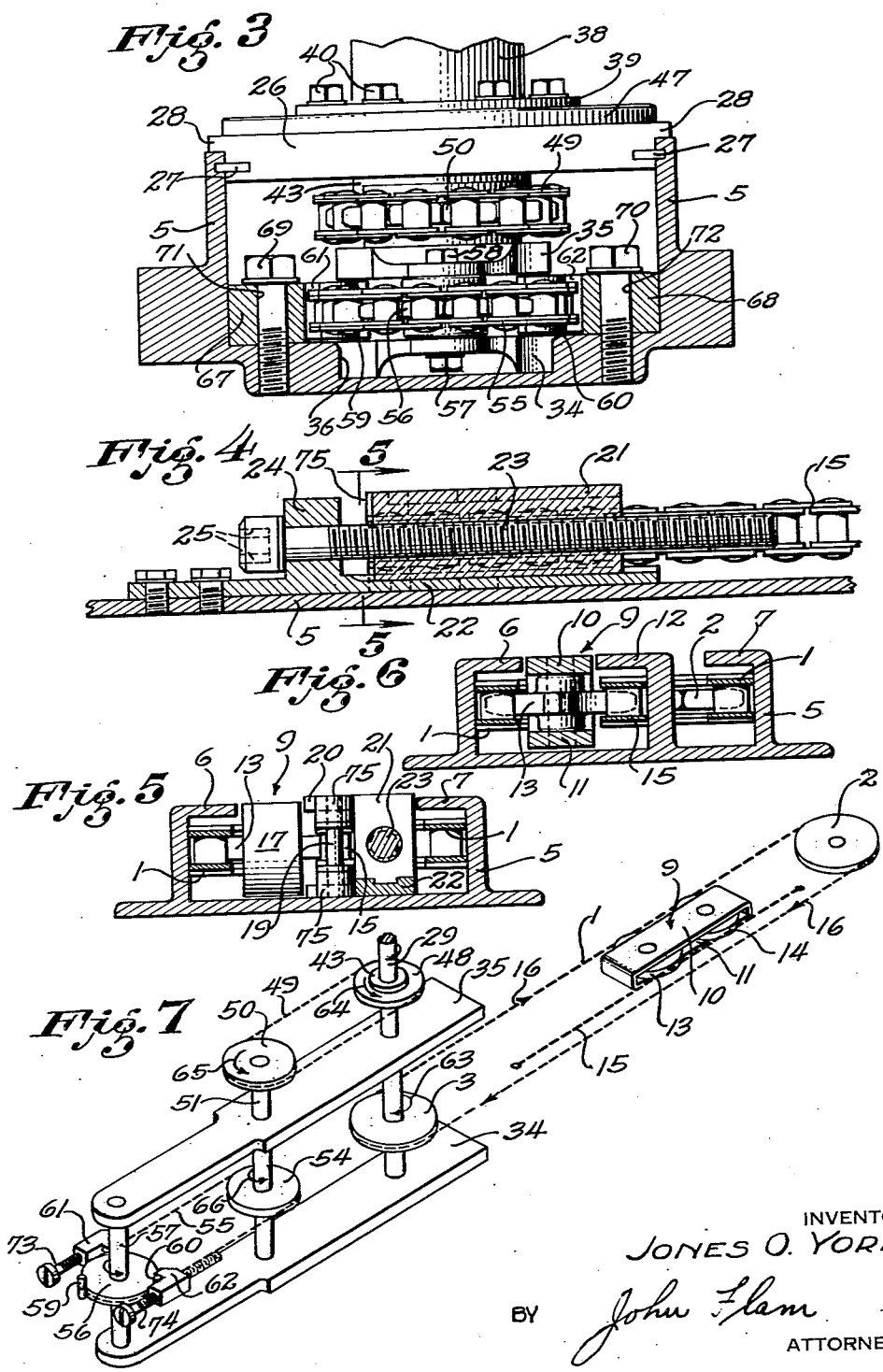
INVENTOR,
JONES O. YORK
BY John Flam
ATTORNEY

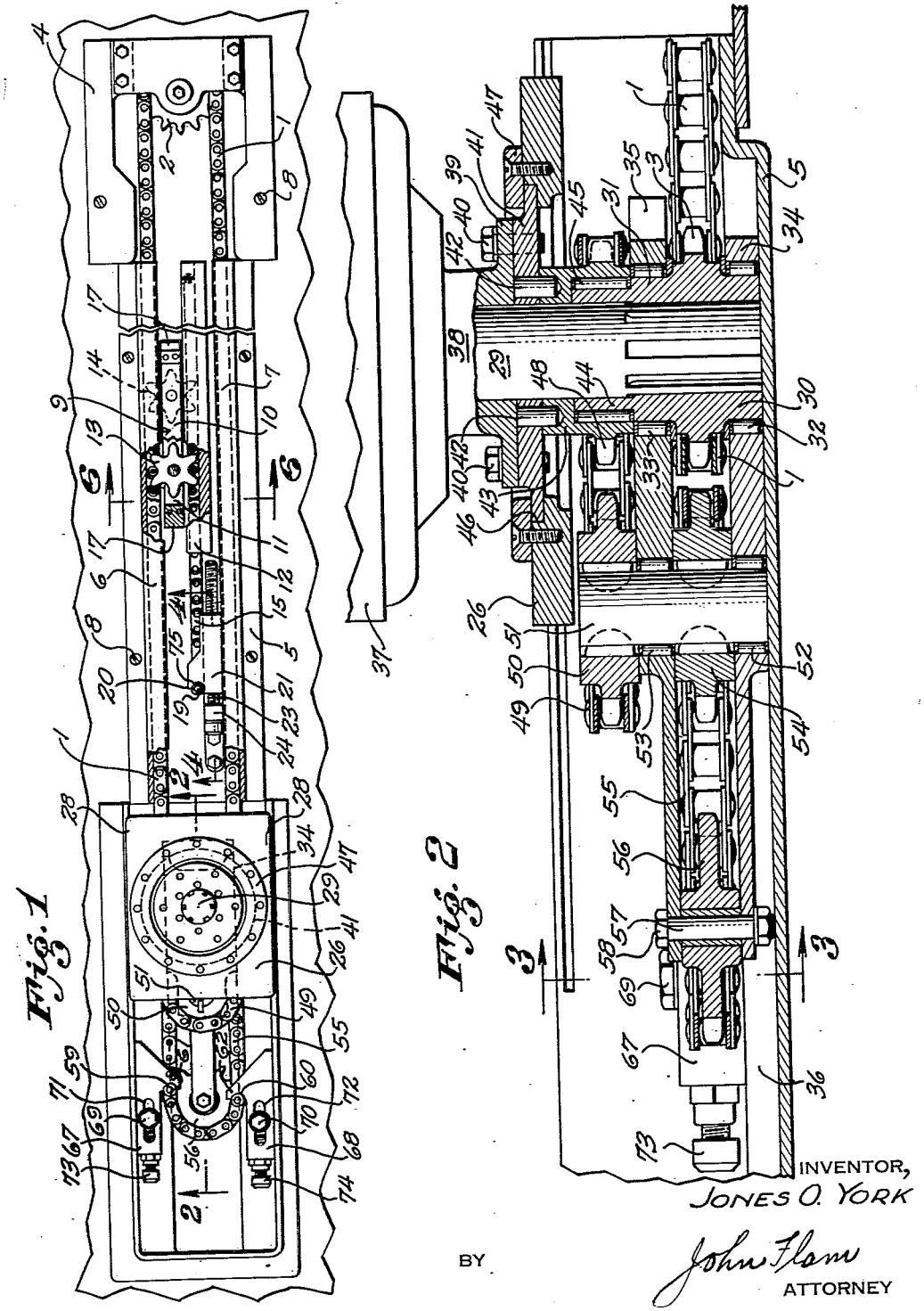

United States Patent Office 2,794,347
Patented June 4, 1957

2,794,347

TENSIONING DEVICE FOR SPROCKET CHAIN CONVEYORS

Jones O. York, Burbank, Calif., assignor, by mesne assignments, to Coast Pro-Seal & Mfg. Co., Los Angeles, Calif., a corporation of California Application July 27, 1953, Serial No. 370,481

7 Claims. (Cl. 74—242.9)

This invention relates to belt type conveyors, and more particularly to an automatically operated tensioning device for such conveyors.

Belt type conveyors, using either sprocket chains or belts, are in common use for moving loads, as, for example, for loading freight or cargo upon a vehicle. They have found extensive use, for example, in moving freight into airplane fuselages. Sprocket chain conveyors adapted for this use are equipped with a "mouse" that is moved by the chain in a direction corresponding to the chain reach. The "mouse" serves to push cargo along the conveyor.

It has been customary to provide a manual belt tightener for such conveyors, so as to eliminate slack in the system. Since such tensioners are of necessity only intermittently operated, the chain or belt is loose for material periods.

It is one of the objects of this invention to provide a tensioner that is automatically operated whenever the conveyor is in use.

Conveyors of this type usually employ an electric motor, for angularly moving a sprocket wheel or pulley, by an appropriate coupling between the motor shaft and the sprocket wheel or pulley. Under such circumstances the torque generated by the motor and effective upon the shaft has an equal and opposite counterpart tending to move the stator of the motor in a direction opposite to that of the shaft. In the usual installation, therefore, the stator is fastened firmly to a base or floor support for preventing angular movement of the stator. By the aid of this invention, this reverse torque is utilized to provide a tensioning force, as by moving the axis of the driving pulley or sprocket wheel in a direction normal to the axis.

Accordingly it is another object of this invention to make it possible to tension a belt or chain by the aid of the torque effects in the motor that operates the conveyor.

In conveyors of this type, an endless loop has usually been so arranged that the extent of travel of the mouse is the same as the travel of the loop. It is another object of this invention to provide a slower traveling mouse than the loops so as to obtain the corresponding mechanical advantage.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a plan view of a tensioning device incorporating the invention, shown as applied to sprocket chain conveyors, the length of the conveyor being partially cut away in order to reduce the size of the figure and the driving motor being removed;

Fig. 2 is a fragmentary enlarged sectional view taken on a plane corresponding to line 2—2 of Fig. 1;

Fig. 3 is an enlarged cross-sectional view taken along a plane corresponding to line 3—3 of Fig. 2;

Fig. 4 is an enlarged fragmentary sectional view taken along a plane corresponding to line 4—4 of Fig. 1;

Fig. 5 is an enlarged sectional view taken along a plane corresponding to line 5—5 of Fig. 4;

Fig. 6 is an enlarged cross-sectional view taken along a plane corresponding to the line 6—6 of Fig. 1; and Fig. 7 is a pictorial diagrammatic view illustrating the manner of operation of the tensioning device.

The conveyor mechanism includes an endless sprocket chain 1 which is in driving engagement with the sprocket wheels 2 and 3, rotatable on spaced parallel axes. In this instance the sprocket wheel 3 is shown as the driving wheel.

The chain 1 may be of considerable length, the axes of the wheels 2 and 3 being spaced apart by a distance corresponding to the desired maximum movement of any load by the aid of the conveyor. In the present instance, these axes are shown as vertical and the movement of the chain 1 as horizontal. However, the chain movement may be inclined so as to move the goods on an incline into or out of a cargo space, such as an airplane fuselage.

The driven wheel 2 may be appropriately mounted for rotation in a frame member 4 (Fig. 1) formed integrally with a main frame member 5, as shown most clearly in Figs. 5 and 6. This frame member 5 may be provided with appropriate overhanging longitudinal flanges 6 and 7 under which the reaches of the chain 1 are accommodated. Appropriate fastening means, such as screws 8, serve to hold the frame member 5 upon any appropriate support.

The movement of the conveyor chain 1 is effective to move a "mouse" 9 which may be coupled in any desired manner to a load to be moved. This mouse 9 includes a pair of spaced upper and lower plates 10 and 11 (see Fig. 6). The upper plate 10 is guided for longitudinal movement by the edges of the overhanging flange 6 and another flange 12 formed integrally with the body 5. Between the two plates 10 and 11 are rotatably mounted a pair of sprocket wheels 13 and 14. Appropriate parallel axes of rotation are provided for these sprocket wheels.

One reach of the chain 1 engages the sprocket wheels 13 and 14. Opposite this reach there is an extended stationary sprocket chain 15 (Figs. 1, 5, 6 and 7).

Now assuming that the sprocket chain 1 is moving in the direction indicated by the arrows 16 by appropriate clockwise rotation of the sprocket wheel 3, the mouse 9 moves toward the right as viewed in Fig. 7 at one half the rate of movement of the chain 1. Counterclockwise direction of the wheel 3 will cause the mouse 9 to travel toward the left, as viewed in Figs. 1 and 7.

Each end of the mouse 9, as shown most clearly in Figs. 1 and 5, is provided with a curved nose 17. The curved surface may be substantially cylindrical and having an axis of curvature normal to the direction of movement of the mouse 9. These end members 17 provide an appropriate anchoring means for a clamp, or the like, or that may serve as an abutment, connecting the mouse to the load for advancing the load along the conveyor. Such devices are well known and no further description is necessary.

Means are provided to keep the stationary chain 15 in tight condition. Thus the left-hand end of this chain 15, as shown most clearly in Figs. 1 and 5, is provided with a vertical pin 19 carrying the rollers 75 at its opposite ends. These rollers engage the hooks 20. These hooks 20 are formed integrally with a block 21 slidable in a guide 22, This guide 22 may be appropriately supported on the bottom surface of the frame 5 (Figs. 4 and 5). A long screw 23 is journaled in a boss 24 mounted on the guide 22 and engages internal threads in the block 21. Accordingly rotation of the screw 23 in an appropriate direction serves to exert a tension force upon the chain 15. For operation of the screw 23, its head is provided with recesses 25 for the accommodation of an appropriate wrench.

Tensioning of the propelling chain 1 is effected by movement of the axis of the driving sprocket wheel 3 in a direction away from the axis of the sprocket wheel 2.

For this purpose the sprocket wheel 3 is mounted in a longitudinally movable carriage structure 26. This carriage structure, as shown most clearly in Figs. 1, 2 and 3, is splined to the walls of the frame 5 by the aid of the keys 27 which project into appropriate slots in the walls of the frame 5. The carriage 26, furthermore, has side flanges 28 resting upon the upper edges of the frame walls. The driving shaft 29 for the wheel 3 passes through this carriage 26 and at its lower end it is splined into the wheel 3, as shown most clearly in Fig. 2.

Oppositely directed hubs 30 and 31 of this wheel 3 are rotatably mounted by the aid of roller bearing structures 32 and 33 in the lower and upper plates 34 and 35. These plates serve to support bearing structures for other elements of the device, as will hereafter be described. Plate 34, as shown most clearly in Fig. 3, is guided by the channel recess 36 for longitudinal movement normal to the axis of the driving shaft 29.

The shaft 29 is shown in Fig. 2 as extending downwardly below the frame of the motor 37, which drives the shaft 29. This motor 37 has an end bearing standard member 38 through which the shaft 29 is guided. A flange 39 is provided on the lower end of this standard, and is bolted as by the machine screws 40 to a circular plate 41. This circular plate 41 thus supports the stator of the motor 37. Plate 41 is dowled by the aid of the pins 42 to the upper portion of the hub 43. This hub 43 is formed integrally with sprocket wheel 48. It is telescoped over the reduced hub 44 of the sprocket wheel 3, and roller bearing elements 45 are transposed between the hubs 43 and 44. The hub 43 thus serves to hold the sprocket wheel 3 against axial movement.

The circular plate 41 is mounted for rotary movement in a recess 46 in the upper surface of the carriage 26. A retaining ring 47 has an inner edge overlying the edge of the plate 41. Accordingly, the reactive torque imposed upon the stator of the motor 37 is effective to move the circular plate 41 angularly within its guide. Since this reactive torque is equal and opposite at all times to the propelling torque of the motor 37, the reactive force is sufficient to move the plate 41 angularly. Any appropriate means, however, could be used to decrease the friction between plate 41 and its support 26, 47. This rotation is utilized for imposing a stretching force upon the chain 1, by moving the carriage 26 toward the left, as viewed in Fig. 2.

For this purpose use is made of the sprocket wheel 48 that is carried by the hub 43. This sprocket wheel 48 has fewer teeth than wheel 3 to provide a tensioning force. It serves to drive a sprocket chain 49 which passes over another sprocket wheel 50. This sprocket wheel 50 is keyed to the upper end of a vertical shaft 51. This shaft 51 passes through the plates 34 and 35 and is rotatably mounted therein by the aid of the roller bearings 52 and 53.

Also keyed to the shaft 51 is another sprocket wheel 54 disposed between the plates 34 and 35 and serving to hold these plates in spaced apart relation. Sprocket wheel 54 serves to drive a sprocket chain 55 that passes over another sprocket wheel 56. This sprocket wheel 56 is journaled on a shaft 57 held in place between the plates 34 and 35 by the aid of a bolt 58 (see also Fig. 3). The hub of this sprocket wheel 56 also serves to maintain the two plates 34 and 35 in spaced apart relation.

A pair of spaced rollers 59 and 60 is carried by the chain 55; and each of them extends axially above and below the chain 55. They serve as projections for alternately engaging hooks 61 and 62. These hooks are held against movement in a manner to be hereinafter described.

Referring now to Fig. 7, the manner in which the torque reaction of the motor stator operates to move the carriage structure toward the left, as viewed in Fig. 7, may be described.

When the sprocket wheel 3 is rotated in a clockwise direction, as indicated by the arrow 63, the sprocket wheel 48 is rotated in the opposite direction, as indicated by the arrow 64, by the rotation of the motor stator. This is true because this sprocket wheel 48 is coupled to the stator of the motor 37 by the aid of the dowel pin 42 and the circular plate 41.

In turn, the sprocket wheel 50 also rotates in a counterclockwise direction, as indicated by the arrow 65. Since sprocket wheel 50 is in driving relation to sprocket wheel 54, this sprocket wheel 54 also rotates in a counterclockwise direction, as indicated by arrow 66. Accordingly, the chain 55 is moved by sprocket wheel 54 in the direction indicated by arrows thereon in Fig. 7. This causes movement and the ultimate contact of the roller 60 with the hook member 62. Continued movement of the chain 55 then causes the entire carriage structure, including the plates 34 and 35, to move toward the left until stopped by the tension in the chain 1. The hook 62 serves, in this process, as a reaction abutment to the rightward pull of chain 55; and continued rotation of wheel 54 is effective to pull the entire carriage structure to the left.

If the sprocket wheel 3 is rotated in a counterclockwise direction, the same movement is effected by contact of the roller 59 with the hook 61. A tensioning effect is therefore produced for either direction of rotation of the driving shaft 29.

The hooks 61 and 62 are provided with blocks 67 and 68 that are bolted to the bottom of the frame 5 as by the aid of the bolts 69 and 70 (Figs. 1 and 3). This bolt passes through slots 71 and 72 formed respectively in these shanks. Adjustment screws 73 and 74 are provided for adjusting the position of the blocks 67 and 68 when the bolts 69 and 70 are loosened. After appropriate adjustment by these screws, the bolts 69 and 70 may be tightened.

The inventor claims:

1. In a tensioner for a device provided with a driving wheel and a flexible element engaged by the wheel, and a driven member engaged by the element: an electric motor having a rotor coupled to the wheel, and coaxial therewith, and a stator; means for mounting the stator for angular motion about the rotor axis; a supporting carriage for the motor and the wheel, and movable in a direction transverse to the axis of the wheel and in a direction away from the driven member; and a transmission mechanism between the carriage and the stator for moving the carriage.

2. In a tensioner for a device provided with a driving wheel and a flexible element engaged by the wheel, and a driven member engaged by the element: an electric motor having a rotor coupled to the wheel, and a stator; means for mounting the stator for angular motion about the rotor axis; a supporting carriage for the motor and the wheel, and movable in a direction transverse to the axis of the wheel; a supplementary wheel mounted on the carriage and angularly moved by the stator; flexible loop means operated by said supplementary wheel, the reaches of the loop being parallel to the flexible element of the device; a projection carried by the loop; and a stop engageable by the projection upon angular movement of the supplementary wheel for causing movement of the carriage, in a direction away from the driven member.

3. In a tensioner for a device provided with a driving wheel and a flexible element engaged by the wheel, and a driven member engaged by the element: an electric motor having a rotor coupled to the wheel, and a stator; means for mounting the stator for angular motion about the rotor axis; a supporting carriage for the motor and the wheel, and movable in a direction transverse to the axis of the wheel; a supplementary wheel mounted on the carriage and angularly moved by the stator; flexible loop means operated by said supplementary wheel, the reaches of the loop being parallel to the flexible element of the device; projection means carried by the loop; and a pair of stops respectively adjacent the reaches of the loop, and engageable by the projection means respectively upon either direction of angular movement of the supplementary wheel in a direction away from the driven member.

4. In a tensioner for a device provided with a driving wheel and a flexible element engaged by the wheel, and a driven member engaged by the element: an electric motor having a rotor coupled to the wheel, and a stator; means for mounting the stator for angular motion about the rotor axis; a carriage for supporting the motor and the wheel, and movable in a direction transverse to the axis of the driving wheel; a pair of sprocket wheels mounted on the carriage and having axes parallel to the axis of the driving wheel; means coupling the stator to one of the wheels; a sprocket chain looped around the sprocket wheels; projection means carried by the chain; and a stop engageable by the projection means upon movement of the chain, in a direction away from the driven member.

5. In a tensioner for a device provided with a driving wheel and a flexible element engaged by the wheel, and a driven member engaged by the element: an electric motor having a rotor coupled to the wheel, and a stator; means for mounting the stator for angular motion about the rotor axis; a carriage for supporting the motor and the wheel, and movable in a direction transverse to the axis of the driving wheel; a pair of sprocket wheels mounted on the carriage and having axes parallel to the axis of the driving wheel; means coupling the stator to one of the wheels; a sprocket chain looped around the sprocket wheels; projection means carried by the chain; and a pair of stops respectively adjacent opposite loops of the chain and engageable by the projection means respectively upon either direction of movement of the chain, in a direction away from the driven member.

6. In a tensioner for a device provided with a driving wheel and a flexible element engaged by the wheel, and a driven member engaged by the element: an electric motor having a rotor coupled to the wheel, and a stator; means for mounting the stator for angular motion about the rotor axis; a carriage for supporting the motor and the wheel, and movable in a direction transverse to the axis of the driving wheel; a pair of sprocket wheels mounted on the carriage and having axes parallel to the axis of the driving wheel; means coupling the stator to one of the wheels; a sprocket chain looped around the sprocket wheels; a pair of spaced projections carried by the chain; and a pair of stops between which the projections extend, and engageable respectively by the projections upon either direction of movement of the chain, in a direction away from the driven member.

7. In a conveyor structure: an endless movable flexible loop element having a pair of reaches; a load moving member having a wheel operatively engaged by one reach only of said element; means for imparting longitudinal motion to the loop; and a stationary member operatively engaging said wheel and located between the other reach and said load moving member; said stationary member being linearly extended throughout its operative length and parallel to said one reach of said loop element.

References Cited in the file of this patent

UNITED STATES PATENTS

| | | |
|---|---|---|
| 642,863 | Creveling | Feb. 6, 1900 |
| 1,242,166 | Fitzgerald | Oct. 9, 1917 |
| 2,074,078 | Swift | Mar. 16, 1937 |
| 2,292,536 | McCabe et al. | Aug. 11, 1942 |
| 2,685,377 | Auger | Aug. 3, 1954 |

FOREIGN PATENTS

| | | |
|---|---|---|
| 451,402 | Italy | Sept. 14, 1949 |